US009668196B2

(12) United States Patent
Courtice (10) Patent No.: US 9,668,196 B2
(45) Date of Patent: May 30, 2017

(54) NETWORK ADMINISTRATOR INTERFACE SYSTEMS AND METHODS FOR MONITORING INDUSTRIAL WIRELESS, SELF-ORGANIZING MESH COMMUNICATION NETWORKS

(71) Applicant: Cooper Technologies Company, Houston, TX (US)

(72) Inventor: Harry John Courtice, Windsor (AU)

(73) Assignee: COOPER TECHNOLOGIES COMPANY, Houston, TX (US)

( * ) Notice: Subject to any disclaimer, the term of this patent is extended or adjusted under 35 U.S.C. 154(b) by 231 days.

(21) Appl. No.: 13/752,789

(22) Filed: Jan. 29, 2013

(65) Prior Publication Data

US 2014/0213311 A1    Jul. 31, 2014

(51) Int. Cl.
*H04B 7/00* (2006.01)
*H04W 40/24* (2009.01)
*H04W 84/18* (2009.01)

(52) U.S. Cl.
CPC .......... *H04W 40/246* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 6,304,273 B1 | 10/2001 | Bonnet | |
| 6,356,758 B1 | 3/2002 | Almeida et al. | |
| 6,487,604 B1 | 11/2002 | Rochford et al. | |
| 8,116,275 B2 | 2/2012 | Matta et al. | |
| 8,824,487 B1* | 9/2014 | Ray | H04L 65/102 370/401 |
| 2002/0122394 A1* | 9/2002 | Whitmore | H04L 12/2854 370/328 |
| 2007/0067446 A1* | 3/2007 | Jones | H04L 12/5692 709/224 |
| 2007/0161371 A1* | 7/2007 | Dobrowski | H04L 41/00 455/423 |
| 2008/0123581 A1* | 5/2008 | Wells | H04W 84/18 370/315 |
| 2011/0038274 A1* | 2/2011 | Ikemoto et al. | 370/252 |
| 2012/0101749 A1 | 4/2012 | Garrett et al. | |

FOREIGN PATENT DOCUMENTS

AU    2012202451 A1    11/2012

OTHER PUBLICATIONS

SmartMesh Industrial PM22511 Network Manager; http://www.dustnetworks.com/products/SmartMeshIndustrial/PM2511; retrieved Jul. 23, 2012; 1 page.

(Continued)

*Primary Examiner* — Mohammed Rachedine
(74) *Attorney, Agent, or Firm* — Armstrong Teasdale LLP (57) ABSTRACT

Systems and method for self-organizing mesh networks of industrial radio devices include identifying and reporting neighboring radio devices and active devices with each radio at the network nodes. The reporting, which is collected by a monitoring device separately provided from the radio devices in the network, facilitates graphical representations of communication routes and current status as active and inactive for review by network administrators at a user interface.

20 Claims, 3 Drawing Sheets

(56) References Cited

OTHER PUBLICATIONS

Network Controller; http://icawww1.epfl.ch/NetController/index.html; School of Computer Communication Sciences; Jan. 2012; 4 pages.
Jigsaw Network Monitoring; http://sysnet.ucsd.edu/wireless/software/; retrieved Jul. 23, 2012; 1 page.
Parbat, B. et al; Data Visualization Tools for WSNs: A Glimpse; International Journal of Computer Applications (0975-8887); May 2010; pp. 14-20; vol. 2-No. 1.
Australian Patent Examination Report No. 2 for Patent Application No. 2013203125, May 27, 2015, 4 pages.
Clausen, T., et al. (edited by), Optimized Link State Routing Protocol (OLSR), Network Working Group, The Internet Society, Oct. 2003, 75 pages.
Draves, R. et al., Routing in Multi-Radio, Multi-Hop Wireless Mesh Networks, Mobicom '04, Sep. 26-Oct. 1, 2004, pp. 114-128.

\* cited by examiner

NETWORK ADMINISTRATOR INTERFACE SYSTEMS AND METHODS FOR MONITORING INDUSTRIAL WIRELESS, SELF-ORGANIZING MESH COMMUNICATION NETWORKS

BACKGROUND OF THE INVENTION

The field of the invention relates generally to input/output devices for wirelessly communicating data in industrial monitoring and control systems, and more specifically to radio frequency (RF) mesh network communication systems.

Supervisory Control and Data Acquisition (SCADA) systems are in widespread use for monitoring and controlling industrial processes of all types. Such SCADA systems typically include a number of remotely monitored locations including sensors, and data and information associated with the sensors at each of the remotely monitored location are communicated via a communications network to other locations, and ultimately to a centralized computer system that manages data collected and controls operation of the industrial process, equipment or facilities associated with the industrial processes. Control commands can likewise be sent to the remote locations using the communications network. In certain applications, the use of long and/or short range radio devices in the data communication networks is highly desirable, and thus RF communication devices have generally been adopted in certain industries for SCADA systems.

In state-of-the-art industrial data communication systems for monitoring and control purposes, spread-spectrum, frequency-hopping RF technology is implemented in mesh network topologies. In such systems, a number of radio devices are arranged to establish a communications network wherein each radio device may communicate with multiple other devices in the network. The spread spectrum technique spreads the RF energy over a predetermined communication channel or channels to reduce the effect of interference as the network operates, while frequency hopping allows the radio devices to use multiple frequencies. Such frequency diversity increases the robustness of each signal path between radio devices in the network, and may effectively overcome interference, destructive reflections or null spots that would otherwise disrupt communications. Mesh networking of the radio devices also provides redundant signal paths such that, even if certain signal paths become unavailable or inoperable to communicate data, communications may still be transmitted using alternate signal paths.

While frequency hopping radio frequency (RF) mesh networks are advantageous in many aspects, they are not without problems, and improvements are desired.

BRIEF DESCRIPTION OF THE DRAWINGS

Non-limiting and non-exhaustive embodiments are described with reference to the following Figures, wherein like reference numerals refer to like parts throughout the various views unless otherwise specified.

DETAILED DESCRIPTION OF THE INVENTION

Figure 1:
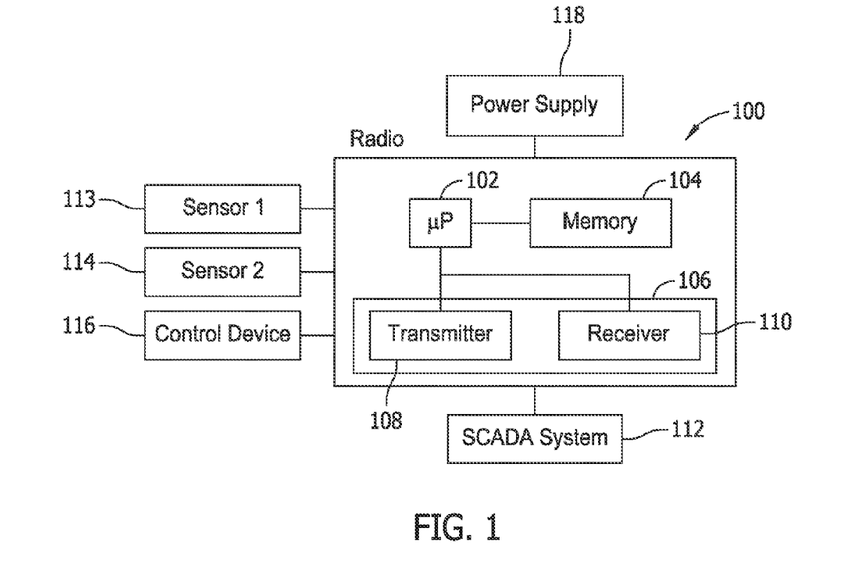
FIG. 1 is a schematic diagram of an exemplary industrial input/output device for wirelessly communicating data in an industrial SCADA system.

FIG. 1 is a schematic diagram of an exemplary industrial input/output device 100 configured to receive input data regarding an industrial process and to communicate the data to a remote location using wireless transmission techniques. More specifically, and as explained below, the input/output device is a radio device 100 that, in combination with other similar devices, may be used to establish a multi-path, wireless data communications network for industrial monitoring and control purposes as further described below.

In the example shown, the radio device 100 is a programmable processor-based device including a processor 102 and a memory storage 104 wherein executable instructions, commands, and control algorithms, as well as other data and information such as communication network and protocol parameters required to satisfactorily operate the radio device 100 are stored. The memory 104 of the processor-based device may be, for example, a random access memory (RAM), and other forms of memory used in conjunction with RAM memory, including but not limited to flash memory (FLASH), programmable read only memory (PROM), and electronically erasable programmable read only memory (EEPROM).

As used herein, the term "processor-based device" shall refer to devices including a processor or microprocessor as shown for controlling the functionality of the device, but also other equivalent elements such as, microcontrollers, microcomputers, programmable logic controllers, reduced instruction set (RISC) circuits, application specific integrated circuits and other programmable circuits, logic circuits, equivalents thereof, and any other circuit or processor capable of executing the functions described below. The processor-based devices listed above are exemplary only, and are thus not intended to limit in any way the definition and/or meaning of the term "processor-based device."

The radio device 100 also includes a radio transmission element 106 that may include a transmitter 108 and a receiver 110. The transmitter 108 and receiver 110 may be separately provided from one another, or alternatively may be combined into a single device referred to as a transceiver. The radio transmission element 106 sends and receives wireless data signals using known radio frequency transmission techniques. The data and information communicated with the radio transmission element 106 may be processed, formatted or converted into an appropriate communications protocol by the processor 102 utilizing information stored in the memory 100. For example, digital radio frequency signals may be transmitted and received using a specified protocol for the contents of the data messages sent in a particular communications network. Parameters for network communication may include data and information such as the size (i.e., the number of bits) of the data signals transmitted, the order of bits constituting the message, unique radio identifiers, hardware and software version codes, security codes, diagnostic codes and the like as those in the art will appreciate.

Additionally, desirable signal processing such as amplification, filtering, signal conversion (e.g., digital to analog conversion), and diagnostic procedures may be performed.

Algorithms and instructions for executing specific communication protocols and procedures are stored in the memory 104, for example, and executed by the processor 102 to communicate information over a communication network, which may be part of a SCADA system 112. The radio device 100 may be part of a remote terminal unit (RTU) in a SCADA system 112.

The radio device 100, as shown in FIG. 1, may be connected to inputs such as sensors, transducers and like monitoring or condition detecting elements associated with the industrial process being monitored and controlled (collectively referred to herein as "sensors") indicated by the reference numerals 113 and 114 and an output element 116 such as a control device for an industrial process. The sensors 113 and 114 generate and provide control feedback signals indicative of the state of the industrial process, and the control device 116 provides for adjustment of the monitored process at the point of the sensors 113 and 114 to effect changes in the state. A variety of sensors are known to detect various aspects of the monitored state which may correspond to a machine state, a component state, a process step, or other parameter of interest to the SCADA system 112. As examples only, monitored aspects of an industrial process detected by the sensors 113 and 114 may include electrical states or conditions (e.g., current or voltage conditions), mechanical states or conditions (e.g., position, velocity, acceleration, stress and strain), a physical state or condition (e.g., temperature, phase, or formulation), an environmental state or condition (e.g., noise, vibration, air quality) and other states or conditions of interest.

A variety of control devices 116 are also known and familiar to those in the art, any of which may be utilized to maintain desired states or conditions of the industrial process, effect changes in states or conditions of aspects of the industrial process, and respond to abnormal or unaccepted states or conditions at various points of interest in the industrial process, related equipment and/or related facilities. The control device 116 may include or may coordinate, switching elements, machine controls or component controls to affect a change in state or condition without human intervention, may interrupt the industrial process to avoid undesirable results stemming from detected states or conditions, or may activate alarm elements and features for response and decisions to be made by human persons. It is understood that the control element 116 may be in the same or different physical location as the sensors 113, 114. That is, the control element 116 may be located upstream or downstream from the sensors 113, 114 in the industrial process such that in practice the sensors 113, 114 and the control element 116 may not be connected to the same radio device 100.

Furthermore, while two sensors 113, 114 and one control device 116 are shown, it is understood that other numbers of sensors and control devices may alternatively be connected to the radio device 100 or to radio devices 100 with like effect. In different embodiments, the sensors 113 and 114 may be hard wired to the radio device 100, may wirelessly communicate with the radio device 100, or be combinations of hard-wired and wireless devices. Typically, a number of radios 100 are distributed throughout the industrial process, with each radio 100 connected to different sensors to provide control inputs and feedback throughout the industrial process, and the radios communicating in a network using the specified communication protocol.

In addition, instead of dedicated sensors and control devices as shown, the functions of these devices could be combined in one or more input/output devices that are capable of bi-directional communication with the radio device or devices 100. In any event, data and information collected via the sensors and/or control devices is collected by each radio device 100 in the SCADA system 112, and communicated to a remote location using the specified communications protocol. Additionally, information such as control commands may be received by the radio device 100 from a remote location according to the specified communication protocol, and sent to the control device 116.

In the example shown in FIG. 1, the radio device 100 is implemented as a sensor node in the larger SCADA system 112. That is, the radio device 100 inputs or receives output signals from the sensors 113 and 114 and outputs or transmits data signals for communicating the sensor signals to a remote location using the proper communications protocol. In another implementation, however, the radio device 100 may function as a control node. When implemented as a control node, the radio device 100 does not directly communicate with any sensor, but rather receives data signals from other radio devices in the network and re-transmits those communications according to the proper communications protocol. In an exemplary embodiment, the radio device 100 is capable of operating in both sensor and control nodes and may be interchangeably used as either one, although if desired dedicated sensor radios and dedicated control radios could alternatively be utilized.

The radio device 100 may be configured as a long range radio device capable of transmitting and receiving radio frequency signals wirelessly over distances of 10-20 km, for example. Compared to other radio devices, the radio device 100 may be considered a relatively high power device designed to broadcast signals over extended distances. An external power supply 118 is therefore connected to the radio device 100, as batteries and other energy storage devices would not provide sufficient power levels to continuously operate the radios over extended time periods as SCADA systems sometimes require.

In different embodiments, the external power supply 118 may be an alternating current (AC) or direct current (DC) power supply coupled to the radio device 100 with an external power line or cable, for example. Generally permanent, hard wired power connections may be established using known screw terminal connections or other suitable techniques for such relatively high powered devices. Additionally, transformers, power amplifiers and the like may be provided in the device 100 to step or step down power supplied from the external supply 114 as necessary, as well as AC to DC or DC to AC converters that may be desirable.

Of course, the radio device 100 may alternatively be configured as a short range radio for communication over shorter distances. When configured as a short range radio, the device 100 may be adequately powered, if desired, by battery devices or other on-board power supplies as those in the art would appreciate. Likewise, short range radio devices may be powered by an external power supply 118 as desired. Any given network of radio devices may include combinations of long and short range radio devices.

Figure 2:
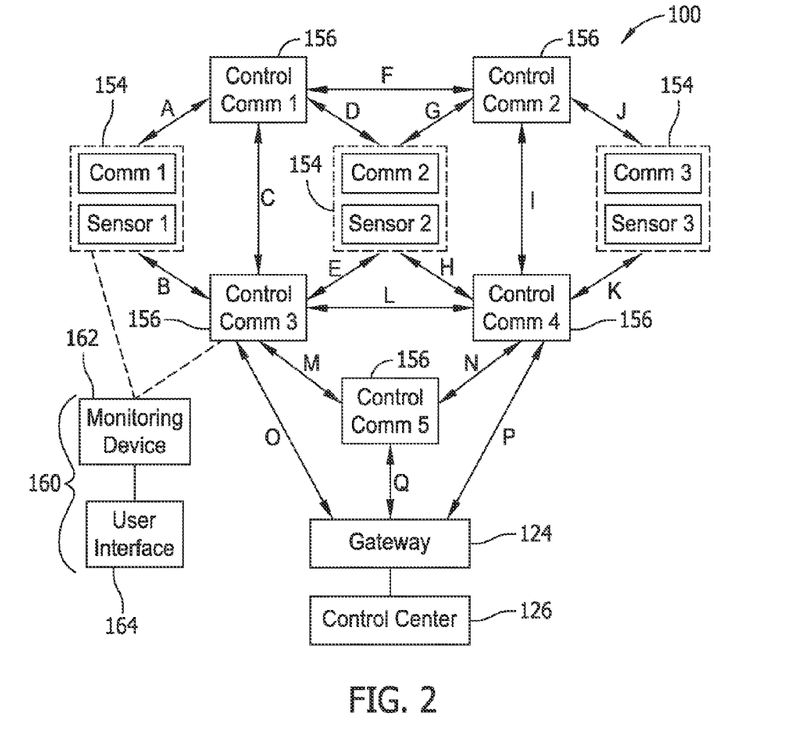
FIG. 2 schematically illustrates an exemplary mesh communication network defined by a plurality of input/output devices such as that shown in FIG. 1, including a network monitoring and administration interface system.

FIG. 2 schematically illustrates an exemplary installation layout of a communications network 120 established with radio devices such as the devices 100 described above. In FIG. 2, the radio devices are generally indicated as part of sensor communication nodes 154 or control communication nodes 156. As shown in FIG. 2, the sensor nodes 154 are associated with one or more sensors at specific points of interest in the industrial process, while the control nodes 156 are associated with sensor nodes 154. Generally speaking, the sensor nodes 154 transmit data signals including state information as detected by the sensors, and the control nodes 156 establish communication paths to and from the sensor nodes 154 and remote command and control centers for the SCADA system.

That is, as shown in FIG. 2, the sensor nodes 154 monitor one or more local operating characteristics of the industrial process proximate their connection locations. In various embodiments, the sensor communication nodes 154 may be mounted on poles, for example, or may alternatively be provided above ground on another support structure, on the surface of the ground, or in the ground in various installations. The control communication nodes 156 are arranged about and interspersed with the sensor communication nodes 154, and are arranged in a mesh network providing multiple wireless communication paths, labeled A through Q in the example of FIG. 2, between the sensor communication nodes 154 and the control communication nodes 156, between the different communication nodes 156, and from the communication nodes 156 to a signal collector or gateway device 124.

The gateway device 124 is itself a processor-based radio device configured to communicate with the sensor nodes 154 and control communication nodes 156. In exemplary embodiments, the gateway device 124 may be a dedicated device specifically adapted for gateway functionality and hence distinct from the radio devices associated with the sensor nodes 154 and the control communication nodes 156. In another embodiment, the radio devices 100 (FIG. 1) that are used to establish the sensor nodes 154 and control communication nodes 156 may be configured to act as gateway devices as needed or as desired.

Broadcast signals from the sensor communication nodes 154 are accordingly transmitted by and amongst the control communication nodes 156 in the network 120 to the gateway device 124. Likewise, control commands may be broadcast from the gateway device 124 and transmitted to a particular sensor node by and amongst the other sensor nodes 124 and/or control communication nodes 156 in the network 120. Because of the multiple and redundant signal paths between the sensor nodes 154, the control communication nodes 156, and the gateway 124 data signals may be reliably transmitted through the communication network 120 to the gateway device 124 even if some of the communication nodes 156 are temporarily compromised (via obstruction, interference, loss of power, etc.), or have failed (via unrecoverable malfunction, damage, defect, etc.) and cannot be used. Paths that cannot be used are sometimes referred to as being "unavailable", and it is possible for communication paths to unpredictably switch state from available to unavailable, and vice versa, as different events occur and as operating conditions change. When paths become unavailable, communications can be re-routed through other available paths. Because the radios are in frequent communication with one another, it will generally be known by any radio which of its neighboring radios within signal range is available, or unavailable, to receive a communication.

Many different mesh topologies are known and may be employed in the network 120. In an exemplary embodiment, the radio devices and associated sensor and control communication nodes are configured to provide a 902-928 MHz, frequency hopping spread spectrum, mesh topology. The mesh network may be algorithmically based and configured to meet specific needs for specific installations. The mesh network may also be self-configuring and self-healing with autorouting and rerouting capability, and is therefore readily scalable. That is the network is readily adaptable and amenable to addition and subtraction of sensor nodes and communication nodes 156.

In exemplary installations, the control communication nodes 156 may be provided in locations spaced from the sensor communication nodes 154, and may be mounted on utility poles, for example, or may alternatively be provided above ground on another support structure, on the surface of the ground, or in the ground in various installations. The spacing of control communication nodes 156 and sensor communication nodes 154 is primarily dependent upon the signal range of the radio devices 100 (FIG. 1) utilized, the actual frequency selected for the communication, and the ambient environment of the nodes 154 and 156. For example, nodes 154 and 156 in above ground installations that are generally free from any obstructions or impediment may be spaced farther from one another than for ground surface or below surface installations.

Digital signal processing transmission techniques utilizing encoded data packets may be employed by the communication nodes 154 and 156 to convey signals including a variety of data and information of interest for a wide variety of devices. That is, the communications protocol may be a byte oriented protocol having multiple bits representative of information of interest. The encoded data and bits of information used to generate data packets for the signals transmitted may include unique radio identifiers corresponding to each of the sensor nodes 154 in the power system, serial numbers for equipment and devices monitored by the sensor nodes, device type codes for monitored equipment and devices, a location code for each sensor node, wireless addresses for the control communication nodes in the signal transmission system, time/date stamps, a software revision code for the application software, a hardware revision code for the gateway device, a data packet count for an incoming message, an error count for incoming data packets and messages, and error codes corresponding to different error conditions for the sensor nodes, the control communication nodes in the signal transmission system, and/or error conditions in the control center 126. Customer identifiers and contact information for operators and maintenance personnel in response to a detected alert or alarm conditions may also be encoded in the signals.

While some exemplary message codes have been described, it is understood that other types of codes, information and data may be included in alternative embodiments, and it is also recognized that less than all of the exemplary protocol bits and codes could be used in other embodiments. Implementation of the message protocols, except as specifically discussed below may be conventionally provided.

The communication nodes 156 are sometimes referred to as repeater/router elements, and the data signals are transmitted among the control communication nodes 156 in a prescribed manner to the gateway device 124. In a further embodiment, one or more of the sensor communication nodes 154 may directly communicate with the gateway device 124, depending on the signal range of the communication nodes and the proximity of the gateway device 124.

Data packets may be reported from the sensor communication nodes 154 on a periodic basis, and data packets may be transmitted repeatedly within specified time periods to ensure that the data packets are completely received, processed, and optionally acknowledged by the gateway device 124. Repeated transmission of data signals avoids collision of signals when more than one of the circuit protectors operates at approximately the same time. Also, the communication nodes 156 may add a routing code, a time stamp or other information to the data packet so that the communication system and signal paths between the sensor communication nodes 154 and the control communication nodes 156 may be monitored.

The gateway device 124 collects the data signals of the communication nodes, and communicates the data signals in the same or different form to control center 126 of the SCADA system 112 (FIG. 1) for processing. More than one gateway device 124 and/or more than one control center 126 may be provided, and a single gateway device 124 may communicate with more than one control center 126. The gateway device 124 may be a network based computer server system, a personal computer, a computer workstation, a programmable logic controller or other electronic controller, a processor-based hand held device or another electronic device or equivalent thereof that may receive, condition, process or interpret signals from the communication nodes 156, and communicate the signals to the control centers 126.

Communication between the gateway device 124 and the control centers 126 may utilize long-range communication schemes such as optical fiber transmission, broadband over powerline systems, WiMAX systems, WiFi systems, Ethernet connections, satellite communications, and the like.

The gateway device 124 may perform data reduction algorithms for processing signal transmissions from the control communication nodes 156 before communicating with the control centers 126. For example, the gateway device 124 may filter incoming data signals and identify duplicate signal transmissions that may occur, for example, when more than one of the communication nodes 156 transmits the same signal to the gateway device 124, or as another example, when the same sensor node 154 signals the communication nodes 156 more than once. Duplicate signals may be discarded or deleted by the gateway device 124 prior to communicating signals to the control centers 126.

Data reduction algorithms performed by the gateway device 124 may also reduce or eliminate information from the data signals that are not necessary for the control center functionality. For example, messaging protocol information pertinent to the radio frequency transmission of the data signals in the network 120 but not pertinent to a messaging protocol for the gateway communication to the control centers 126 may be stripped, eliminated, or deleted from the data signals before transmission to the control centers 126.

The gateway device 124 may also perform authentication, verification, or security algorithms to ensure the integrity of the signals of the communication nodes, as well as perform diagnostic, testing, and troubleshooting procedures to ensure proper installation and operation of the communication nodes 154 and 156.

Communicated signals from the gateway device 124 may be received at the control centers 126 where they may be processed, decoded or interpreted using appropriate hardware and software. Interactive, menu driven and graphic displays may be presented to the user at the control station 126, allowing the user to capably oversee the industrial process(es) being monitored in more or less real time as operating conditions change. The user or operator of the software may be prompted to take appropriate action in response to detected events, alarms and alerts may automatically be generated to appropriate persons, and certain protective actions may be automatically undertaken by the control system in response to communication from the sensors.

Additionally, sensed data information and reports may be compiled and generated by the gateway device 124 and/or the control centers 126 as a useful tool for proactive management of the monitored industrial process(es).

Having now described the basic operating algorithm features of the gateway device 124 and the control centers 126 functionally, programming of the gateway device and control center equipment to operate in the manner described may be conventionally provided by those in the programming arts without further explanation.

The network 120 may generally be used in a wide variety of industrial applications. Exemplary applications may include: pharmaceutical plants, systems, and production facilities, oil and gas production and distribution systems and facilities; mining production and refining systems and facilities; water and waste water treatment systems and facilities; utility distribution (e.g., natural gas and electric power systems and distribution networks); aquaculture and agricultural production systems and facilities; pulp and paper mill manufacturing systems and facilities; and road and rail network management systems and facilities. Still other applications are possible, as the network configuration capabilities are practically unlimited for use in different end use applications.

While the invention has thus far been described in the context of a single communications network 120, multiple communications networks may be advantageous for the maintenance and oversight of certain industrial systems and facilities. Accordingly the communication networks established with the radio device 100 (FIG. 1) may be established as stand-alone networks, or may share communication nodes with other mesh networks to increase the redundancy and improve reliability of the SCADA system. Various communication networks may be categorized, grouped, or subgrouped as desired to accommodate complex industrial systems and facilities, or to control different facilities or distribution systems over widespread geographic areas.

For example, the control communication nodes 156 in various mesh networks may be discretely grouped into defined areas and utilize short range communication techniques, with longer range communication techniques being utilized to transmit information between different facilities. Further, it may be desirable to provide mesh networks that may communication with one another through the longer-range gateway device 124, as well as with the central control center 126. Special purpose mesh networks may also be created, and such special purpose mesh networks may overlap wholly or partially with other mesh networks, or may stand alone from other mesh networks.

In further embodiments, providing more than one gateway device 124 may be desirable to further enhance communications by reducing the number of communication nodes need to reach the gateway device 124, or to facilitate communication between different communication networks. When multiple gateway devices 124 are provided, some communication nodes 156 may communicate selectively with some of the gateway devices but not with others. That is, special purpose gateways may be provided that collect only certain types of messages and ignore others.

The benefits of such mesh communication networks are numerous. The sensor nodes 154 and the communication nodes 156 may be retrofit to existing facilities, equipment and devices, and expensive point-to-point wiring is avoided via the wireless communication. The relatively costly gateway device 124 may be shared by hundreds of communication nodes, lowering overall equipment costs of the system. As mentioned earlier, the additional nodes can either be allowed to communicate with the nodes within its own family group, or they can use existing nodes to assist in the meshing capability of the network, leading to further cost savings.

Expansion of the network 120 may be accomplished by simply adding communication nodes 154 and 156 in the signal range of other communication nodes 156. The node count may be rapidly expanded to accommodate growth and changes in monitored industrial processes and facilities. Regardless of expansion or modification of the power system 100, given the low relative cost of the communication nodes, additional communication nodes can be readily added into the network to monitor additional points of interest if desired.

Communication between the nodes 156 and the gateway device 124 may be bi-directional, facilitating transmission of control signals corresponding to command instructions from the control centers 126 to a specific location in the monitored industrial process.

The communications protocol is adaptable to communicate virtually any type of information or type of data to the control center, and control decisions could be made based upon the communicated information. In certain networks of the type described, and particularly in frequency hopping, radio frequency mesh networks, certain problems can occur.

In certain types of communication networks which are controlled by a central coordinating unit, information regarding the operation of the network is known to the central coordinating unit, and may be practically presented to a person, such as a network administrator, in graphical form so that the person can easily assess operational aspects of the network. In self-organizing mesh networks such as those described above, however, there is no central coordinating unit and there is no single data store representing the mesh structure. Rather, the information about the mesh structure is distributed, by design, across the nodes of the network and the mesh structure and information is, by design, subject to considerable change in response to real time operating conditions as the network operates. Known network visualization tools are therefore ineffective, and challenges to administrating and overseeing self-organizing mesh networks exist.

Generally speaking, it is often possible for a message to be routed along more than one message path in the network. Each radio device is typically in a position to directly communicate with more than one other radio device in the network. That is, each radio device is typically located within signal range of two or more other radio devices with which it may directly communicate. Direct communication is distinguished from indirect communication in which a message transmitted between two radio devices must first pass through another radio device. Radio devices that may directly communicate with one another are referred to herein as neighboring radios. In the example of FIG. 2, the radio device of Comm 1 station 154 is a neighboring radio of the radio device of Control Comm 1 156 and also Control Comm 2 156 because direct communication is established via the communicating links A and B. The radio device of Comm 1 station 154 is not a neighboring radio of the radio device of Control Comm 5 156, 1 however, because a message from the Comm 1 station can only reach the Control Comm 5 station through another radio device, such as the Control Comm 3 station.

The radio devices are configured, however, to selectively utilize the paths available, and do not always direct or route messages to or through all of neighboring radios. Some paths may be preferred to other paths with neighboring radio devices, and thus some path with neighboring radios may be deemed active paths that are presently preferred and being utilized to route messages, other paths can be deemed inactive or standby paths that are available but not presently being used. Path metrics are known that can be utilized to determine active paths and standby paths, with the active paths typically offering better performance than standby paths. As such, the active paths are utilized as they offer the best performance from a communications perspective, while the standby paths provide redundant message paths that may be called upon when needed. Because the active and standby paths are determined in real time, as operating conditions change, the status of available paths as active or inactive has a tendency to change over time.

As mentioned above, paths with neighboring radios may also become "unavailable" from time to time, and such unavailable paths will again become unavailable available in a rather unpredictable manner as the network is used. Especially as radio devices are added or subtracted from the network, the status of paths as active, inactive, or unavailable is subject to abrupt changes. Subtraction of radios may relate to generally unpredictable failure modes of existing radio devices or radio devices otherwise temporarily becoming off line.

The dynamic nature of the mesh network wherein active paths can become standby paths, standby paths can become active paths, and active or standby paths can become available and unavailable as actual operating conditions of the network change is both beneficial and problematic in self-organizing and adaptive mesh networks. The ability of the radio devices to quickly adapt to changing conditions allows the network to continue to operate in a wide variety of operating conditions without intervention by human administrators that non-adaptive networks would otherwise require. The adaptive nature of the network is problematic, however, as network administrators responsible for the network's operation and maintenance generally cannot know at any given point in time which paths in the network are active, inactive or unavailable. Because of this, administrators cannot meaningfully assess the robustness of the network as it operates, or to effectively take measures to improve network operation.

For the purposes of the present discussion, robustness of the network refers to the redundancy of the network as it operates. Mesh networks are, at least initially, designed to provide a robust selection of signal paths between radios to ensure that redundant signal paths are available for routing messages when needed. In operation, however, and because of the dynamic nature of the network operation, what was a well-designed system for installation can present weaknesses in use.

For example, it is possible for one or more radio devices in the network to become temporarily isolated and unable to communicate, or for one or more of the radio devices to have only a single operating path available. That is, no standby paths may be available for any given radio from time to time. Such conditions are undesirable and can negatively affect the operation of the network, or even compromise the ability of messages to be efficiently communicated from certain ones of the radio devices. If certain conditions were to occur, the network can become vulnerable to being inoperative in certain portions of the network.

As another example, a network may have been well designed at the time installation and operated with the desired robustness for some period of time. However, as the network expands or contracts over time, the robustness of the resultant network may become less than what it was, or less than desired, in some or all portions of the network.

Finally, as the radio and network technology continues to develop, the notion of what is, or is not, robust is also subject to change. Of course, network administrators are interested in assessing the robustness of their networks and making improvements if possible.

If operating weaknesses and network vulnerabilities were known to network administrators, they may be addressed by adding other radio devices, taking possible measures to correct conditions that are causing paths to become unavailable, or taking measures to cause standby paths to become active paths, if possible, and change the network dynamics. In conventional mesh networks of the type described, however, actual operating status of the paths available as used (i.e., active paths) or not used (i.e., standby paths) is generally unknown to the network administrators at any given point in time, and the status of paths as available or unavailable is also generally unknown to network administrators at any given point in time. As a result, suboptimal operating conditions may exist and problems in the network may occur indefinitely without the network administrators ever realizing them. Proactive management of the network to achieve optimal operation, or at least improvements in the operation of the network, is therefore generally frustrated from the network administration perspective. Of course, better knowledge of network behavior in use may also benefit manufacturers of the radio devices and network designers, but at present such information is not readily assimilated in a practical form to quickly assess network operation at any given point in time.

Exemplary systems, methods and algorithms are described below that allow network administrators and other persons to visualize the connectivity within self-organizing and self-adapting radio mesh networks. This allows network administrators and other users to evaluate how robust the network is, or perhaps even how it will be, when subjected to changing radio paths and failures of radio devices at the various nodes within the network. Presentation of actual status information of the communication paths in the network, in graphical form, allows persons to evaluate changes in mesh network quality and robustness by visual inspection.

Accordingly, and as shown in FIG. 2, the network 120 is provided with a monitoring interface system 160 including a monitoring device 162 and a user interface 164. The monitoring device 162 in contemplated embodiments is itself a processor-based device and is separately provided from the radio devices in the network 120. That is, the monitoring device 162 in such an embodiment is not itself utilized as a sensor node or communication node in the network to route data messages from a source radio to a destination radio in the network. Rather, the monitoring device is provided solely to communicate with a radio (or radios) in the network 120 for administrative purposes to assess the robustness of the network and the status of the various message paths while the network 120 is operating. As such, the monitoring device 162 collects data from the radio(s) on the network 120 concerning the status of message paths between neighboring radio devices, which can be assimilated into graphical form on the user interface 164 for review by a network administrator or other person.

Figure 3:
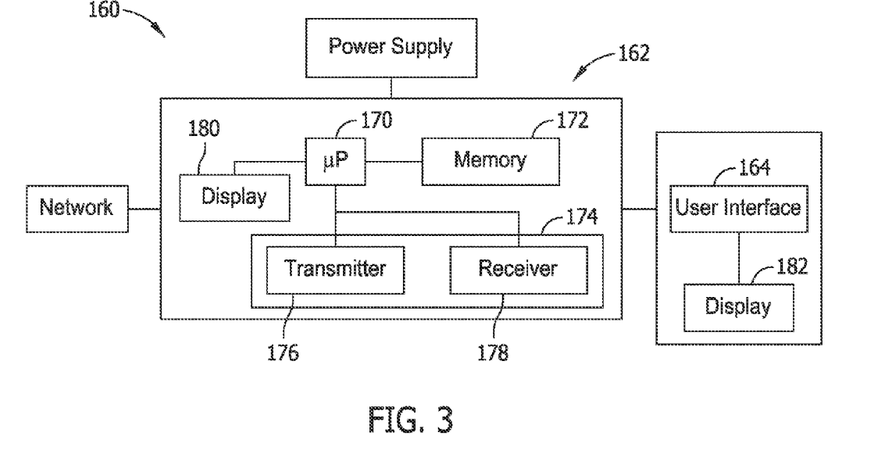
FIG. 3 is a schematic diagram of the network monitoring and administration interface system shown in FIG. 2.

The monitoring device 102 may include, as shown in FIG. 3, a processor 170 and a memory storage 172 wherein executable instructions, commands, and control algorithms, as well as other data and information such as communication network and protocol parameters required to satisfactorily operate the monitoring device 160 are stored. The memory 172 of the processor-based device 162 may be, for example, a random access memory (RAM), and other forms of memory used in conjunction with RAM memory, including but not limited to flash memory (FLASH), programmable read only memory (PROM), and electronically erasable programmable read only memory (EEPROM).

As used herein, the term "processor-based device" shall refer to devices including a processor or microprocessor as shown for controlling the functionality of the device, but also other equivalent elements such as, microcontrollers, microcomputers, programmable logic controllers, reduced instruction set (RISC) circuits, application specific integrated circuits and other programmable circuits, logic circuits, equivalents thereof, and any other circuit or processor capable of executing the functions described below. The processor-based devices listed above are exemplary only, and are thus not intended to limit in any way the definition and/or meaning of the term "processor-based device."

The monitoring device 162 also includes a radio transmission element 174 that may include a transmitter 176 and a receiver 178. The transmitter 176 and receiver 180 may be separately provided from one another, or alternatively may be combined into a single device referred to as a transceiver. The radio transmission element 176 may send and receives wireless data signals using known radio frequency transmission techniques and therefore communicate with at least one of the radio devices in the network 120. As such, and in the example shown in FIG. 2, the monitoring device 162 may be placed within signal range of one or more of the radio devices at the stations 154, 156 in the network 120, and using the transmitter 176 may request information from one of the stations 154, 156 using the applicable communications protocol and receive the requested information with the receiver 178. Optionally, the monitoring device 162 may include an interface display 180 in which a network administrator or other user may view the information received in any convenient form, including graphical form.

The data and information communicated with the radio transmission element 176 may be processed, formatted or converted into a form suitable for use by the user interface 164, which may itself be a processor-based device including an interface display 180 upon which graphical information may be visually presented to a network administrator or other person to quickly assess the operation of the network 120.

Various possibilities are contemplated for the embodiments of the monitoring device 162 and the user interface 164. For example, the monitoring device 162 in one embodiment may be a special purpose radio for data collection purposes, while the user interface 164 may be a notebook or tablet computer device. As such, the system 160 may be mobile and a network administrator may collect data and view the network status while being physically present at different points in and around the network.

Alternatively, the functionality of the monitoring device 162 and the interface 164 could be integrated into a single, portable device that both collects the information and displays it to the user. In such mobile embodiments, the monitoring device 162 may be present in the network only temporarily.

In another embodiment, one or more of the monitoring devices 162 could be embedded in the network at a fixed location, and local or remote access to the information could be obtained with the user interface device 164. Web based or local network access could be provided via hard wired or wireless techniques to communicate data collected from the monitoring device 162 to the user interface 164. Embedded monitoring devices may prove problematic, however, if for whatever reason the radio or radios within signal range are not able to communicate when the network information is requested or needed.

In still another embodiment, functionality of the monitoring device could be integrated into the gateway 124 and related information could be visually presented on a user interface in the control center 126. The flexibility and lower cost of the alternatives mentioned above, however, may be more beneficial for many types of networks and users, particularly for retrofit-type of use on existing systems.

Figure 4:
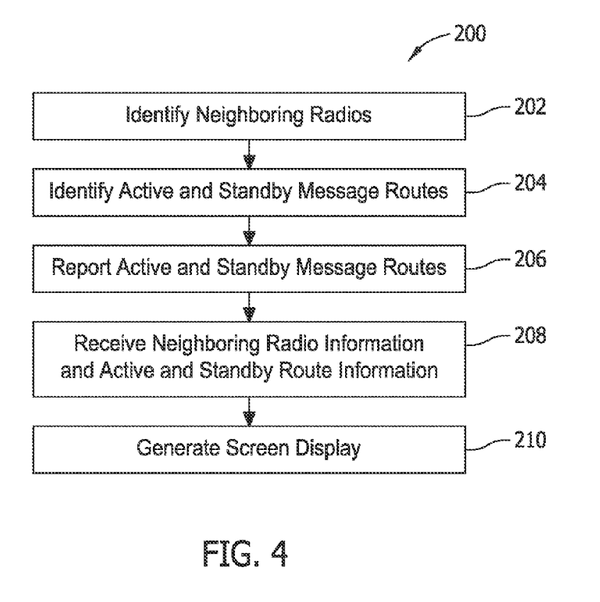
FIG. 4 is an exemplary method flowchart for the network monitoring and administration interface system shown in FIG. 3.

FIG. 4 illustrates an exemplary flowchart of a method 200 of administrating a multi-path radio communications network, such as the network 120 having a plurality of processor-based radio devices 100 configured to wirelessly communicate with one another in a self-organizing mesh network. The method 200 may be implemented as algorithms in the processor based devices as explained in the exemplary implementation below.

At step 202, the method includes identifying, with each of the plurality of processor-based radio devices 100, respective neighboring radio devices in the network. This information is, as a practical matter, required for operation of the network 120, and each radio device in the network may perform this step in a known manner. Further discussion thereof is omitted.

At step 204 the method includes identifying, with each of the plurality of processor-based radio devices 100, respective active message routes and standby message routes relating to each of the neighboring radio devices in the network 120. That is each radio device 100 selects which of the available message paths with neighboring radios that it is presently using to route messages (i.e., active message routes) and available but less preferred message paths (i.e., standby paths) that provides a redundant signal path that is not presently being utilized in the network 120. Again, this information is, as a practical matter, required for operation of the network 120, and each radio device in the network may perform this step in a known manner using path metrics and the like to determine the active paths. Further discussion thereof is omitted. It is understood that that the standby paths need not be directly reported in all embodiments as they can be inferred from the list of neighboring radios and the active routes.

At step 206, the method 200 includes reporting the identified respective neighboring radio devices and active message routes, with each of the plurality of processor based radio devices 100, over the network to the other radio devices. That is, each radio device in the network broadcasts its neighboring radio and route status information to the other radios on the network. Optionally quality information about the routes such as signal strength, data rate, or bit error rate can also be collected and reported. As such, each radio device in the network can receive and store complete information for all the radio devices concerning the neighboring radios throughout the network 120 and the status of active and inactive paths throughout the network.

The reporting at step 206 can be performed periodically in an automated manner as the network operates, or can be performed on demand when needed. That is, one of the radio devices in the network may request such neighbor and route status information from other radio devices, perhaps in response to a request from the monitoring device 162, and the information may then be collected and reported to the monitoring device. In another embodiment, the information can be reported at step 206 only when a change is detected in either the neighbor information or the active route information for one of the radios on the network.

At step 208, the method includes receiving the reported identified respective neighboring radio devices and active message routes with the monitoring device 162. In contemplated embodiments, this is performed wirelessly by the radio devices, although the information could otherwise be downloaded, accepted or received in another manner.

At step 210, the method includes generating, with the processor-based network administration interface 164, a graphical screen display, based on the reported identified respective neighboring radio devices and active message routes from step 208. By visual inspection of the screen display, the network administrator may obtain a wealth of information that conventionally has not been available for self-organizing mesh networks in a rather straightforward and intuitive manner.

Figure 5:
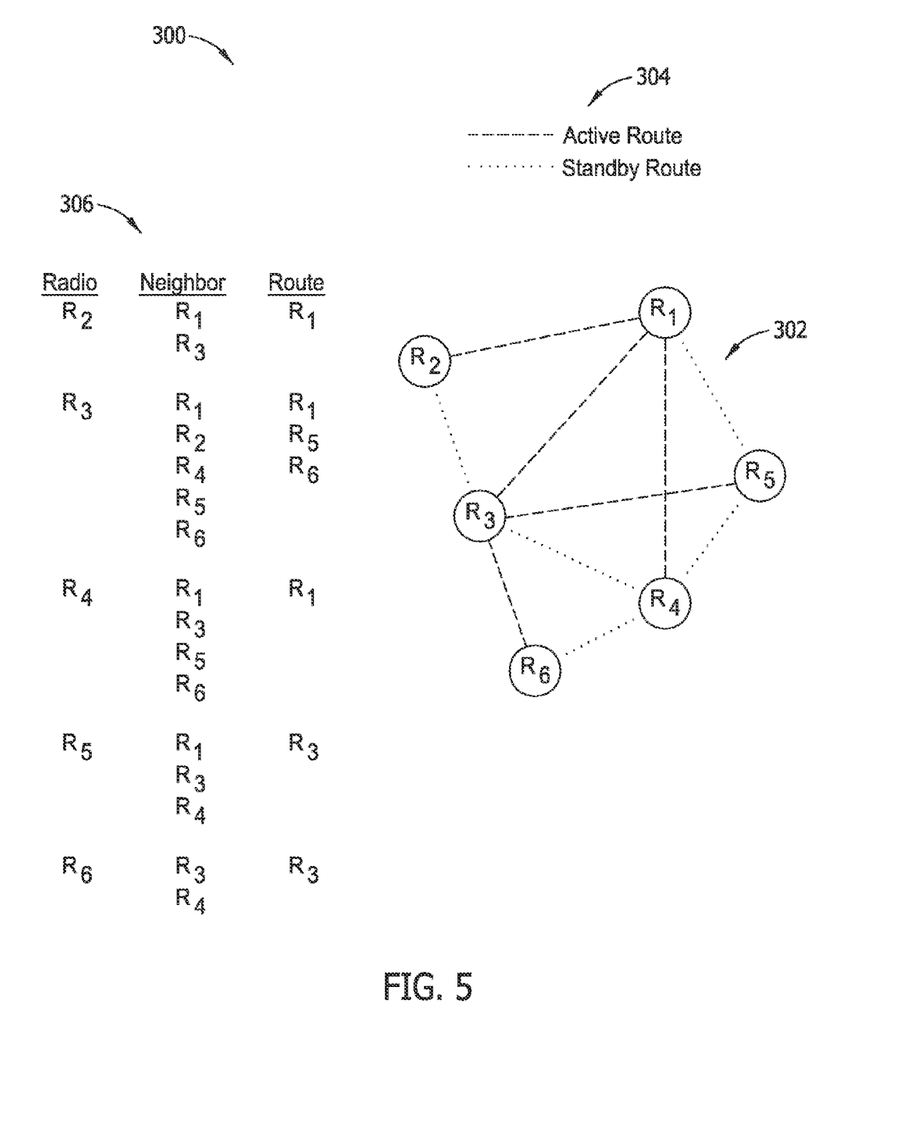
FIG. 5 is an exemplary screen display generated by the administrator interface system.

FIG. 5 illustrates an exemplary screen display 300 that may be generated at step 210 (FIG. 4). As shown in the display 300, at least a portion of the network is graphically depicted as shown at 302 including at least some of the plurality of processor-based radio devices and their respective reported neighboring radio devices. In the example of FIG. 5, six radio devices $R_1$, $R_2$, $R_3$, $R_4$, $R_5$ and $R_6$ are shown and may represent some or all of a network being assessed. Also, the graphical depiction 302 in the example shown generally indicates message routes incoming to the radio $R_1$, which represents a particular location or destination in the network.

The display 300 may include a legend 304 for the network administrator's benefit in interpreting the graphical depiction 302. In the example shown, active paths between the radio devices shown are indicated by a broken line while standby (inactive) paths are indicated by a dotted line. One can see visually from the depiction 302 which message paths between the radio devices $R_1$, $R_2$, $R_3$, $R_4$, $R_5$ and $R_6$ are active or inactive. Various possible ways of demarcating and distinguishing active and inactive paths are possible and may be utilized. Also in the example shown, only "available" paths are depicted. Paths between radio devices that that may exist, but are deemed "unavailable" are not shown in the display 300 in this example.

To further facilitate a ready understanding of the message routes depicted, the screen display 300 also includes a list indicated at 306 of the neighboring radios in the depiction 300 for each respective one of the plurality of processor-based radio devices $R_2$, $R_3$, $R_4$, $R_5$ and $R_6$ in the screen display depiction 300. For each radio device, the neighboring radio devices and active message routes are shown. It can be seen that at least one active path and at least one standby path exists for each of the radio devices $R_2$, $R_3$, $R_4$, $R_5$ and $R_6$. None of the radio devices $R_2$, $R_3$, $R_4$, $R_5$ and $R_6$ are shown to lack a standby path, which would be of particular concern to a network administrator because this situation renders the affected radio vulnerable to not being able to communicate messages over the network if certain conditions were to occur.

Specific details of each of the radio nodes depicted in the display 300 may be reviewed by the network administrator both in the graphical depiction and the in the listing. In the example shown in FIG. 5, the radio device $R_2$ is listed having two neighboring radios $R_1$ and $R_3$, and one active route exists through the radio $R_1$. One can see from the depiction that the other route through the radio $R_3$ is a standby path. Since one active path and one standby path exists for this radio, a network administrator may be satisfied that the network is robust from the perspective of radio $R_1$ because even if the communication path from radio $R_2$ to $R_1$ were to fail, a message could alternatively be sent from radio $R_2$ to $R_3$.

If, on the other hand, the existence of one active path and one standby path for transmissions from the radio $R_2$ presents concern to the network administrator, the administrator may take a corrective action, such as installing another radio device as a neighboring radio to the radio $R_1$ and provide an additional path for use as an active route or an alternatively standby route for the radio $R_1$. Alternatively, a network administrator may compare the depiction 302 to an installation plan for installed radio devices and see that expected paths between installed radios have become unavailable, and hence take corrective measures to investigate potential causes of the unavailability and restore their operation to improve network robustness.

In various further embodiments, the network administrator or other user may be provided options to view only the active routes, view only the inactive routes, or even to review unavailable routes. The administrator can therefore review the information in visual form in varying levels of detail via the display 300. Quality information relative to the active routes shown such as signal strength, data rate, or bit error rate can also be included in the display 300 when such information is reported and available. The quality information may be collected in both the network depiction 302 and in the listing 306. Different colors and indicia may be utilized in the depiction 302 to identify and distinguish routes having different signal strengths, data rates, bit error rates, etc. The legend 304 may include appropriate descriptors for the network administrator's use in interpreting the depiction 302.

Various portions of the network may be investigated individually or collectively using the systems and methods described above. An effective understanding of the network operation at any moment may quickly be gleaned by visual inspection of the information presented, and effective troubleshooting of the network may be accomplished in a manner that has not conventionally been possible in the type of networks described because detailed information of the mesh structure is typically not automatically available at the network master in conventional networks and systems.

The systems and methods described may also be of benefit to network administrators, network designers and equipment manufacturers of the network devices because differences between the theoretical operation of the system and the actual operation of the system can be observed and studied. In other words, expected results can be compared to actual results as the networks are installed or modified, and improvements can be made from both equipment design perspectives and installation perspectives as the network is constructed. Accordingly, data archiving features and reporting features may be integrated allowing for detailed studies of network operation over time.

In contemplated embodiments, the user interface displays may be implemented conventionally in a computer program embodied on a computer readable medium and having segments of code or instructions executed by a computer that correspond to the various functions and features described above. The technical effect of the processes and systems described herein is achieved when data and information pertaining to the neighboring radios and route status is entered, transmitted, downloaded or otherwise accepted by the monitoring device 162. As mentioned, the user interface and display may be integrally provided in the monitoring device 162 in some embodiments.

It is understood that additional segments of code corresponding to additional displays, links, graphics, information, and indicia may be provided in further embodiments, and further that not all of the exemplary information provided in the above-described displays and screens need be used in some embodiments of the invention. The user interface displays may be varied to suit the needs of specific networks, may be customized for particular devices and users, and may be modified while providing the same or similar benefits.

Having now described the functional aspects of the systems and methods described, it is believed that those in the art can program the processor-based devices described to implement the functionality described above without further explanation.

The benefits and advantages of the inventive concepts are now believed to be evident in view of the exemplary embodiments disclosed.

An embodiment of a multi-path radio communications system for monitoring and controlling an industrial process has been disclosed. The network includes: a plurality of processor-based radio devices configured to wirelessly communicate in a self-organizing mesh network wherein each radio is arranged to communicate with multiple other radio devices in the mesh network; wherein at least one of the plurality of processor-based radio devices is configured to: identify neighboring radio devices in the network; identify active message routes relating to each of the neighboring radio devices; and report the identified neighboring radio devices and active message routes over the network.

Optionally, the multi-path radio communications system may also include a monitoring device receiving the report from the at least one of the plurality of processor-based radio devices. The multi-path radio communications system may also include a processor-based network administration interface in communication with the monitoring device. The processor-based network administration interface may be integral to the monitoring device. The processor-based network administration interface may be connected to the monitoring device via one of a local and remote connection.

The processor-based network administration interface may be configured to generate a graphical screen display, based on the report from the at least one of the plurality of processor-based radio devices. The screen display may graphically depict the at least one of the plurality of processor-based radio devices and its reported neighboring radio devices. The screen display may graphically depict reported active routes between the at least one of the plurality of processor-based radio devices and at least one of the neighboring radio devices. The screen display may also graphically depict standby routes between the at least one of the plurality of processor-based radio devices and respective ones of the neighboring radio devices.

An embodiment of a multi-path radio communications system has also been disclosed. The communications system includes: a plurality of processor based radio devices configured to wirelessly communicate with one another in a self-organizing mesh network, each of the plurality of processor based radio devices configured to: identify respective neighboring radio devices in the network; identify respective active message routes relating to each of the neighboring radio devices; and report the identified respective neighboring radio devices and active message routes over the network.

The multi-path radio communications system may further include a monitoring device receiving the report from at least one of the plurality of processor-based radio devices. The multi-path radio communications system may also include a processor-based network administration interface in communication with the monitoring device. The processor-based network administration interface may be integral to the monitoring device. The processor-based network administration interface may be connected to the monitoring device via one of a local and remote connection.

The processor-based network administration interface may be configured to generate a graphical screen display, based on the report from the at least one of the plurality of processor-based radio devices. The screen display may graphically depict at least a portion of the network including at least some of the plurality of processor-based radio devices and their respective reported neighboring radio devices. The screen display may graphically depict reported active routes between the at least some of the plurality of processor-based radio devices and their respective neighboring radio devices. The screen display may also graphically depicts standby routes between the at least some of the plurality of processor-based radio devices and respective ones of the neighboring radio devices. The graphical screen display may include a list of neighboring radios for each respective one of the plurality of processor-based radio devices.

An exemplary method of administrating a multi-path radio communications network having a plurality of processor based radio devices configured to wirelessly communicate with one another in a self-organizing mesh network has also been disclosed. The method includes: identifying, with each of the plurality of processor based radio devices, respective neighboring radio devices in the network; identifying, with each of the plurality of processor based radio devices, respective active message routes relating to each of the neighboring radio devices; and reporting the identified respective neighboring radio devices and active message routes, with each of the plurality of processor based radio devices, over the network.

The method may also include: providing a monitoring device; and receiving the reported identified respective neighboring radio devices and active message routes with the monitoring device. The method may further include providing a processor-based network administration interface in communication with the monitoring device. Providing a processor-based network administration interface in communication with the monitoring device may include providing an interface that is integral to the monitoring device. Providing a processor-based network administration interface in communication with the monitoring device may also include providing a processor-based network administration interface separate from the monitoring device, and connecting the monitoring device and a processor-based network administration interface via one of a local and remote connection.

The method may also include generating, with the processor-based network administration interface, a graphical screen display, based on the reported identified respective neighboring radio devices and active message routes. The method may include graphically depicting, via the screen display, at least a portion of the network including at least some of the plurality of processor-based radio devices and their respective reported neighboring radio devices. The method may include graphically depicting, via the screen display, reported active routes between the at least some of the plurality of processor-based radio devices and their respective neighboring radio devices. The method may include graphically depicting, via the screen display, standby routes between the at least some of the plurality of processor-based radio devices and respective ones of the neighboring radio devices. The method may also include, via the screen display, displaying a list of neighboring radios for each respective one of the plurality of processor-based radio devices in the screen display.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A multi-path radio communications system for monitoring and controlling an industrial process, the multi-path radio communications system comprising:
    a plurality of processor-based radio devices configured to wirelessly communicate in a self-organizing mesh network wherein each processor-based radio device is arranged to communicate with multiple other processor-based radio devices in the self-organizing mesh network;
    wherein at least one of the plurality of processor-based radio devices is configured to:
        identify neighboring processor-based radio devices in the self-organizing mesh network;
        identify active message routes and standby message routes relating to each of the neighboring processor-based radio devices; and
        report the identified neighboring processor-based radio devices and the active message routes and standby message routes over the self-organizing mesh network; and
    a processor-based network administration interface receiving the report and configured to generate a graphical screen display based on the report;
    wherein the graphical screen display includes a visual depiction of the at least one of the plurality of processor-based radio devices and associated neighboring processor-based radio devices; and
    wherein the graphical screen display indicates and distinguishes the active message routes and standby message routes relating to each neighboring processor-based radio device.

2. The multi-path radio communications system of claim 1, further comprising a monitoring device receiving the report from the at least one of the plurality of processor-based radio devices.

3. The multi-path radio communications system of claim 2, wherein the processor-based network administration interface receives the report from the monitoring device.

4. The multi-path radio communications system of claim 3, wherein the processor-based network administration interface is connected to the monitoring device via one of a local and remote connection.

5. The multi-path radio communications system of claim 1, wherein the graphical screen display includes a list of the plurality of processor-based radio devices and their neighboring relationships with other of the plurality of processor-based radio devices.

6. The multi-path radio communications system of claim 1, wherein the processor-based network administration interface is configured to generate the graphical screen display showing only active message routes, only standby message routes, or only unavailable message routes.

7. The multi-path radio communications system of claim 1 wherein the processor-based network administration interface is configured to generate a graphical screen display showing unavailable message routes.

8. A multi-path radio communications system comprising:
a plurality of processor-based radio devices configured to wirelessly communicate with one another in a self-organizing mesh network, each of the plurality of processor-based radio devices configured to:
identify respective neighboring processor-based radio devices in the self-organizing mesh network;
identify respective active message routes and standby message routes relating to each of the neighboring processor-based radio devices; and
report the identified respective neighboring processor-based radio devices and active message routes and standby message routes over the self-organizing mesh network; and
a processor-based network administration interface receiving reports from the plurality of processor-based radio devices and configured to generate a graphical screen display based on the reports;
wherein the graphical screen display includes a visual depiction of the plurality of processor-based radio devices whereby neighboring relationships between the plurality of processor-based radio devices are observable; and
wherein the graphical screen display indicates and distinguishes the active message routes and standby message routes between neighboring processor-based radio devices.

9. The multi-path radio communications system of claim 8, further comprising a monitoring device receiving the reports from at least some of the plurality of processor-based radio devices.

10. The multi-path radio communications system of claim 9, wherein the processor-based network administration interface is connected to the monitoring device via one of a local and remote connection.

11. The multi-path radio communications system of claim 8, wherein the graphical screen display includes a list of neighboring processor-based radio devices for each respective one of the plurality of processor-based radio devices.

12. The multi-path radio communications system of claim 8, wherein the processor-based network administration interface is configured to generate the graphical screen display showing only active message routes, only standby message routes, or only unavailable message routes.

13. The multi-path radio communications system of claim 8 wherein the processor-based network administration interface is configured to generate a graphical screen display showing unavailable message routes.

14. A method of administrating a multi-path radio communications network having a plurality of processor-based radio devices configured to wirelessly communicate with one another in a self-organizing mesh network and a processor-based network administration interface, the method comprising:
identifying, with each of the plurality of processor-based radio devices, respective neighboring processor-based radio devices in the self-organizing mesh network;
identifying, with each of the plurality of processor-based radio devices, respective active message routes and respective standby message routes relating to each of the neighboring processor-based radio devices;
reporting the identified respective neighboring processor-based radio devices and the respective active message routes and standby message routes, with each of the plurality of processor based radio devices, over the self-organizing mesh network; and
generating, with the processor-based network administration interface, a graphical screen display including a visual depiction of the plurality of processor-based radio devices, whereby all neighboring relationships between the plurality of processor-based radio devices are observable; and
wherein the graphical screen display indicates and distinguishes the active message routes and standby message routes between neighboring processor-based radio devices.

15. The method of claim 14, further comprising:
providing a monitoring device; and
receiving the reported identified respective neighboring radio devices and the respective active message routes and standby message routes with the monitoring device.

16. The method of claim 15, further comprising receiving the reported identified respective neighboring processor-based radio devices and the respective active message routes and standby message routes with the monitoring device.

17. The method of claim 16, further comprising connecting the monitoring device and the processor-based network administration interface via one of a local and remote connection.

18. The method of claim 15, further comprising, via the graphical screen display, displaying a list of neighboring processor-based radio devices for each respective one of the plurality of processor-based radio devices.

19. The method of claim 14 wherein generating the graphical screen display comprises presenting an option to a user to display only active message routes, only standby message routes, or only unavailable message routes.

20. The method of claim 14 wherein generating the graphical screen display comprises generating a graphical screen display showing unavailable message routes between neighboring processor-based radio devices.

* * * * *